United States Patent [19]

Brown

[11] 4,278,260

[45] Jul. 14, 1981

[54] SEAL UNIT

[75] Inventor: John E. Brown, Mansfield Woodhouse, England

[73] Assignee: West & Sons (Engineers) Limited, Nottinghamshire, England

[21] Appl. No.: 84,734

[22] Filed: Oct. 15, 1979

[30] Foreign Application Priority Data

Mar. 11, 1978 [GB] United Kingdom ............... 09739/78

[51] Int. Cl.³ .............................................. F16J 15/32
[52] U.S. Cl. .................................... 277/110; 277/117; 277/144; 277/152; 277/165; 277/190
[58] Field of Search ....................... 277/102, 110–112, 277/116.2, 116.8, 117, 118, 144, 147, 152, 165, 170–172, 188 R, 190, 191, 206 R

[56] References Cited

U.S. PATENT DOCUMENTS

| 2,192,565 | 3/1940 | Szekely | 277/110 |
|---|---|---|---|
| 2,247,031 | 6/1941 | Norton | 277/110 |
| 2,358,408 | 9/1944 | McMurray | 277/111 |

FOREIGN PATENT DOCUMENTS

| 1368672 | 6/1964 | France | 277/110 |
|---|---|---|---|
| 539886 | 2/1956 | Italy | 277/110 |

*Primary Examiner*—Robert S. Ward, Jr.
*Attorney, Agent, or Firm*—Paul & Paul

[57] ABSTRACT

A seal unit for providing a fluid seal between a shaft and a housing. THe seal unit includes a seal element screw threadedly received within an annular casing. The seal is made of a rigid but resilient material so that on rotation of the seal element within the casing the seal element is caused to deflect to bring it into sealing engagement with the shaft. Such an arrangement makes it possible to use a seal element having an internal diameter larger than the shaft to be sealed so that the seal element may be slid over the shaft without causing damage to the sealing surface of the seal element.

4 Claims, 2 Drawing Figures

SEAL UNIT

The present invention relates to a seal unit.

It is known to provide a seal unit for sealing isolating bearing assemblies, the unit having an annular metal casing which has a peripheral face which is arranged to be an interference fit in the housing containing the bearing assembly and also includes two radially inwardly extending flanges to define in axial cross-section a channel which contains an annular seal element normally made of an elastomeric material. The seal element has a shaft engaging lip which is biased to a radially inward position by means of an annular coiled spring. The diameter of the lip is less than that of the shaft and consequently it is moved radially outwardly when it is slid over the shaft. Such a procedure tends to damage the surface of the lip and consequently reduces the working life of the seal unit.

According to the present invention there is provided a seal unit for providing a seal between a shaft and a housing through which the shaft projects, the unit including an annular casing having a cylindrical portion and an inwardly directed flange portion, an annular seal element having an outer peripheral edge for contacting the inner face of the cylindrical portion and an inner peripheral edge for sealingly engaging the shaft, the outer peripheral edge of the seal element and the inner face of the cylindrical portion each having a screw thread formation so that on rotation of the seal element relative to the casing the seal element is placed under an axial compressive loading which causes the inner edge to move radially inwardly to engage the shaft.

Reference is made to the accompanying drawings, in which.

Figure 1:
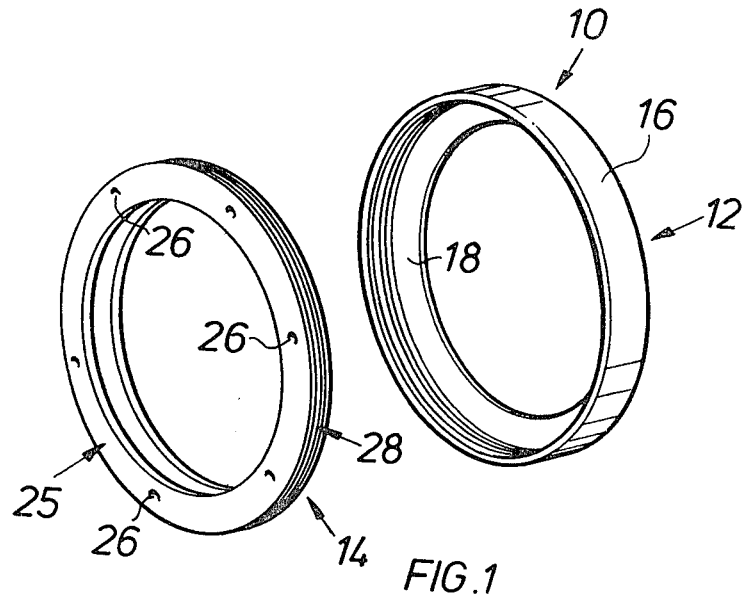
FIG. 1 is an exploded perspective view of a seal unit according to the present invention.
Figure 2:
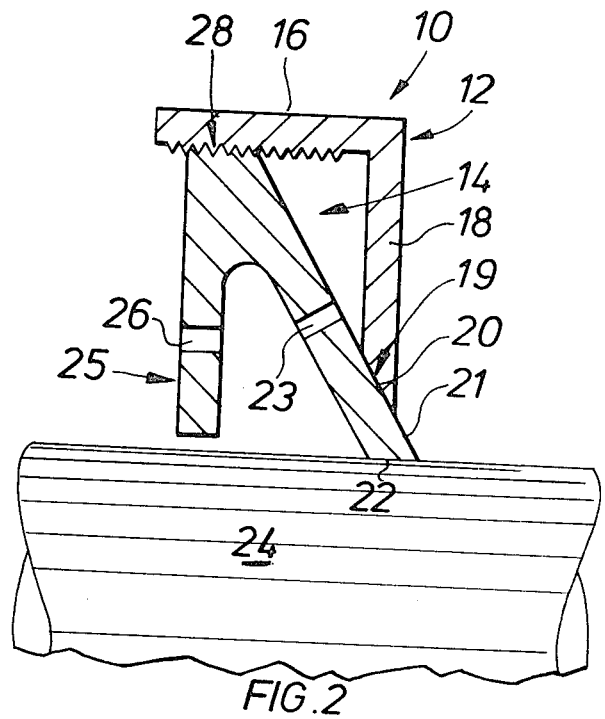
FIG. 2 is an axial section through the assembled seal unit of FIG. 1.

The seal unit is generally shown at 10 and includes an annular casing 12 and a seal element 14.

The casing 12 has a generally cylindrical wall portion 16 from one axial end of which depends a radially inwardly directed flange portion 18. The flange portion 18 has a marginal portion 19 which is inclined to define a sealing face 20. The internal face of wall portion 16 is provided with a screw thread.

The seal element 14 is generally frusto-conical in shape so that its outer face 21 can sealingly abut against sealing face 20. The seal element 14 also has a terminal edge 22 which sealingly engages the shaft 24 extending therethrough. A series of apertures 23 spaced about the circumference are provided in the seal element to permit fluid communication between either side of the seal element.

Depending from the outer edge of the seal element 14 is an annular flange 25 which is provided with apertures 26 spaced about its circumference. The radially outermost face 28 of the seal element 14 possesses a screw thread so that the seal element may be threadedly received within the casing 12. Rotation of the seal element 14 relative to the casing 12 is achieved using a key (not shown) having projections which engage in apertures 26.

If the seal element 14 is rotated when faces 20 and 21 are in contact so that is is moved axially toward flange portion 20, the seal element is axially compressed causing terminal edge 24 to move radially inwards and conversely the seal element is rotated in the opposite direction, the axial compression is relieved and the terminal edge 24 is caused to move radially outwardly. The maximum diameter of terminal edge 24 is therefore achieved when the seal element is not under an axial compressive loading, i.e. when it is in a relaxed condition. This maximum diameter is chosen to be slightly greater than the diameter of the shaft on which the seal unit is to be used.

Thus, in use, with the seal element 14 is a relaxed condition the seal unit may be easily axially slid over the shaft. Once the casing 12 has been forced into position (by any conventional method) within the housing through which the shaft projects the seal element 14 is rotated by means of the key so that the terminal edge 24 is brought into sealing engagement with the shaft. If desired, the seal element 14 may be prevented from rotating relative to the casing by use of a conventional glue such as Locktite as supplied by Should wear of edge 24 take place after continued use, this may be accommodated by rotating the seal element relative to the casing 12.

In the illustrated embodiment annular flange 25 and seal element 14 are made in one piece using a suitable plastics material such as a polyimide or polyamide, e.g. Nylatron as supplied by Polypenco Limited. Such materials are rigid but resilient enough to enable the seal element to undergo deflection under compression rather than undergoing a distortion in shape.

I claim:

1. A seal unit for providing a seal between a shaft and a housing through which the shaft projects, the unit including an annular casing having a cylindrical portion and an inwardly directed flange portion, an annular seal element having an outer peripheral edge for contacting the inner face of the cylindrical portion and an inner peripheral edge for sealingly engaging the shaft, the outer peripheral edge of the seal element and the inner face of the cylindrical portion each having a screw thread formation so that on rotation of the seal element relative to the casing the seal element is placed under an axial compressive loading which causes the inner edge to move radially inwardly to engage the shaft.

2. A seal unit according to claim 1 wherein the annular member is provided with a series of formations cooperable with a key to enable the annular member to be rotated relative to the casing.

3. A seal unit according to claim 2 wherein the formations are apertures.

4. A seal unit according to claim 1, 2 or 3 wherein the annular member and seal element are formed in one piece from a suitable plastics material.

* * * * *